United States Patent [19]
Link et al.

[11] Patent Number: 5,638,934
[45] Date of Patent: Jun. 17, 1997

[54] HYDRAULICALLY OPERATED CLUTCH ASSEMBLY FOR A MOTOR VEHICLE HAVING A HYDRAULIC SYSTEM WITH A MULTIPLICITY OF CYLINDERS

[75] Inventors: Achim Link, Schweinfurt; Reinhold Weidinger, Unterspiesheim, both of Germany

[73] Assignee: Fichtel & Sachs AG, Schweinfurt, Germany

[21] Appl. No.: 428,700

[22] Filed: Apr. 25, 1995

[30] Foreign Application Priority Data

Apr. 27, 1994 [DE] Germany ........................ 44 14 684.1

[51] Int. Cl.⁶ .................................................. F16D 13/54
[52] U.S. Cl. .................................. 192/70.25; 192/111 A; 192/91 A
[58] Field of Search ...................... 192/70.11, 70.25, 192/85 CA, 91 A, 98, 111 A

[56] References Cited

U.S. PATENT DOCUMENTS

| | | |
|---|---|---|
| 2,885,049 | 5/1959 | Staadt . |
| 3,946,845 | 3/1976 | Kamio . |
| 4,556,137 | 12/1985 | Abe . |

FOREIGN PATENT DOCUMENTS

| | | |
|---|---|---|
| 2604228 | 3/1988 | France . |
| 1425206 | 12/1968 | Germany . |
| 3128424 | 6/1982 | Germany . |
| 1003331 | 9/1965 | United Kingdom . |
| 1188893 | 4/1970 | United Kingdom . |
| 1223333 | 2/1971 | United Kingdom . |
| 1466651 | 3/1977 | United Kingdom . |
| 2116283 | 9/1983 | United Kingdom . |
| 2130331 | 5/1984 | United Kingdom . |

*Primary Examiner*—Charles A. Marmor
*Assistant Examiner*—Saul Rodriguez
*Attorney, Agent, or Firm*—Nils H. Ljungman and Associates

[57] ABSTRACT

A system for engaging or disengaging a friction clutch has at least one drive, which drive is connected to an energy accumulator and is intended to move against the force of a spring mechanism of a friction clutch. The system can have at least one adjusting mechanism for the drive to compensate for the axial shift resulting from the change in position of the spring mechanism due to wear on the friction clutch. This adjusting mechanism can include an actuating mechanism connected to the transfer element. The actuating mechanism can be moved in the direction of motion of the drive, and can include a retaining mechanism which restricts the extension of the actuating mechanism by means of a stop. The retaining mechanism, by means of a retaining force, secures the orientation of the stroke of the actuating mechanism against an axial displacement until an axial shift occurs due to wear of the friction clutch. When there is wear to the friction clutch, a reduction in the force of the spring mechanism can result, which force acts against the actuation force applied by the energy accumulator, since the force of the spring mechanism is reduced, a resulting axial force arises which exceeds the magnitude of the retaining force and an adjustment for the wear can thus be made.

20 Claims, 7 Drawing Sheets

FIG. 3
III-III

HYDRAULICALLY OPERATED CLUTCH ASSEMBLY FOR A MOTOR VEHICLE HAVING A HYDRAULIC SYSTEM WITH A MULTIPLICITY OF CYLINDERS

BACKGROUND OF THE INVENTION

1. Field of the Invention

The present invention generally relates to a system for engaging and disengaging a friction clutch of a motor vehicle. The system can have at least one drive, which drive can be connected to an energy accumulator. The drive is intended to move against the force of a spring mechanism of a friction clutch, such as a diaphragm spring, by means of a transfer element.

2. Background Information

German Patent No. 31 28 424 A1 discloses a hydraulic system for engaging or disengaging an automobile friction clutch, wherein the system has a multiplicity of radially separated drives in the form of cylinders running parallel to the axis of rotation of a clutch bearing. The drives are connected to a master cylinder which acts as an energy accumulator to impinge the respective pistons with hydraulic medium, thereby causing the pistons to extend against the force of a spring mechanism of a friction clutch. The pistons are interconnected by means of a disk-shaped transfer element. Upon depressurization of the master cylinder, the spring mechanism pushes the pistons back into their original position.

After a friction clutch has been in operation for a long period of time, the friction surfaces become increasingly thin as a result of wear, whereby the spring mechanism causes a pressure plate to advance in the axial direction. As a result, a downstream system for engaging or disengaging must then perform a different stroke, which in known systems is accomplished in that additional hydraulic medium is fed from a equalizing vessel of the master cylinder into either the master cylinder or the slave cylinder.

OBJECT OF THE INVENTION

The object of the present invention is to design a system for engaging and disengaging a friction clutch so that the stroke for engaging and disengaging remains constant, even in the event of an axial shift of the spring mechanism due to wear.

SUMMARY OF THE INVENTION

This object can preferably be achieved by means of at least one adjusting mechanism associated with the drive to compensate for the axial shift resulting from the change in position of the spring mechanism due to wear of the friction clutch. The adjusting mechanism can preferably include an actuating mechanism and a retaining mechanism. The actuating mechanism can be moved in the direction of motion of the drive, and the retaining mechanism preferably restricts the extension of the actuating mechanism by means of an associated stop. Further, the retaining mechanism, by means of a retaining force, secures the orientation of the stroke of the actuating mechanism against an axial displacement, until an axial shift of the spring mechanism occurs due to wear of the friction clutch. When there is wear to the friction clutch, a reduction in the force of the spring mechanism results, which force acts against the actuation force applied by the energy accumulator, and thus an axial force can be generated by the energy accumulator which exceeds the magnitude of the retaining force of the retaining mechanism.

By utilizing an adjusting mechanism in accordance with the present invention, which adjusting mechanism includes an actuating mechanism which is connected to the transfer element and which can follow the movement of the piston or pistons, the actuating mechanism can, in the event of a change in position of the spring element (such as a diaphragm spring or a diaphragm plate) due to wear, follow the movement of the piston or pistons to the extent permitted by the retaining mechanism, which retaining mechanism is likewise a part of the adjusting mechanism. As discussed briefly above, this retaining mechanism can preferably maintain the position of the actuating mechanism by means of a stop. Thus, the stroke of the actuating mechanism can be essentially constant during engaging or disengaging, until the spring mechanism undergoes an axial displacement as a result of wear of the friction surfaces of the clutch plate.

In the event of such an axial displacement of the spring mechanism, the force exerted by the spring mechanism on the actuating mechanism in a first effective direction decreases, while the same amount of actuation force for engaging and disengaging, which is applied to the actuating mechanism by the drive realized as a hydraulic cylinder or a stepped motor, can continue to be applied in the opposite direction. As a result, the actuating mechanism is impinged in the direction of the spring mechanism by the actuation force exerted by the drive, which force exceeds the retaining force exerted on the actuating mechanism by the retaining mechanism. The consequence of this is that the actuating mechanism follows the spring mechanism until again coming in contact with the spring mechanism and the force relationship between the latter and the drive present in an unworn clutch can be restored. If a hydraulic drive is used, for example, the feeding of additional hydraulic medium from a reserve vessel in the master cylinder acting as an energy accumulator can essentially be eliminated due to this axial displacement of the actuating mechanism, so that the system always works with the same amount of hydraulic medium and thus the same stroke of the actuating mechanism.

In accordance with the retaining means of the present invention, it can essentially be guaranteed that the stroke of the actuating cylinder can only be displaced in a single direction, namely the direction of displacement of the spring mechanism determined by the wear of the friction surfaces of the friction clutch. In addition, the transfer element preferably interacts on the clutch-side end of the actuating mechanism with a stop. By means of the stop, the transfer element can preferably limit the depth of retraction of the actuating mechanism into the adjusting mechanism.

In accordance With one advantageous embodiment of the adjusting mechanism in accordance with the present invention, the retaining mechanism acts as a stationary part of the adjusting mechanism, and a stop of the adjusting mechanism can preferably be moved relative to a bearing of the adjusting mechanism if the retaining force is exceeded by the axial force of the energy accumulator. The axial force of the energy accumulator occurring as a result of a wear-dependent axial displacement of the spring mechanism displaces the stop by a like distance before the stop is again effective as a stationary stop. This can be advantageously achieved if the stop is held in place by means of a positive interlock with the retaining mechanism. This positive interlock essentially only becomes ineffective when the wear-dependent axial force exceeds a predetermined amount.

In accordance with one embodiment, the retaining mechanism can preferably include a sleeve having a stop thereon, the inside of which sleeve can preferably serve as a guide for the actuating mechanism as it moves to engage or disengage. In addition, the actuating mechanism can preferably have, on its transmission side end, a radial projection which can be brought into contact with the stop to limit the distance that the actuating mechanism extends out from the adjusting mechanism when engaging or disengaging.

In accordance with another embodiment of the adjusting mechanism, the retaining mechanism can follow the movements of the actuating mechanism and can come into contact with the stop realized as a fixed part of the adjusting mechanism at the maximum extension of the actuating mechanism. This retaining mechanism can preferably interact with a stationary stop located in the adjusting mechanism in that as soon as the retaining mechanism comes in contact with the stop, the action of wear-dependent effective axial force ensures a passage for the actuating mechanism. In accordance with one advantageous embodiment of such a retaining mechanism, the retaining mechanism can be realized as an elastic element mounted by means of a positive interlock on the actuating mechanism.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, end maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a clutch assembly for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for biasing the pressure plate in at least one of the following directions a) and b): a) towards the clutch disc; and b) away from the clutch disc; means for actuating the clutch disc, the actuating means comprising: at least one drive which is connected to an energy accumulator and is intended to move against the force of the biasing means, whereby the drive acts upon a transfer element, wherein there is at least one adjusting mechanism for the drive to compensate for the axial shift resulting from a change in position of the biasing means due to wear of the clutch disc, which adjusting mechanism includes an actuating mechanism, which actuating mechanism can be moved in the direction of motion of the drive, and a retaining mechanism, which retaining mechanism restricts the extension of the actuating mechanism by means of an associated stop and which by means of a retaining force secures the orientation of the stroke of the actuating mechanism against an axial displacement when there is no wear of the clutch disc, until an axial shift of the biasing means occurs due to wear, wherein a reduction in the force of the biasing means acting against the actuation force applied by the energy accumulator results in the generation of an axial force by the energy accumulator which exceeds the magnitude of the retaining force of the retaining means.

Another aspect of the invention resides broadly in a method of operating a friction clutch assembly for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining means for contacting the pressure plate and the flywheel during engagement of the clutch disc with the flywheel; means for biasing the pressure plate in at least one of the following directions a) and b): a) towards the clutch disc; and b) away from the clutch disc; means for actuating the clutch disc, the actuating means comprising: at least one drive which is connected to an energy accumulator and is intended to move against the force of the biasing means, whereby the drive acts upon a transfer element, wherein there is at least one adjusting mechanism for the drive to compensate for the axial shift resulting from a change in position of the biasing means due to wear of the clutch disc, which adjusting mechanism includes an actuating mechanism, which actuating mechanism can be moved in the direction of motion of the drive, and a retaining mechanism, which retaining mechanism restricts the extension of the actuating mechanism by means of an associated stop and which by means of a retaining force secures the orientation of the stroke of the actuating mechanism against an axial displacement when there is no wear of the clutch disc, until an axial shift of the biasing means occurs due to wear, wherein a reduction in the force of the biasing means acting against the actuation force applied by the energy accumulator results in the generation of an axial force by the energy accumulator which exceeds the magnitude of the retaining force of the retaining means, the method comprising the steps of: providing a flywheel, the flywheel defining an axis of rotation and an axial direction parallel to the axis of rotation; providing a clutch disc; providing a pressure plate for applying an axially directed force to the clutch disc to engage the clutch disc with the flywheel; providing the clutch disc with friction lining means for contacting the pressure plate and the flywheel during engagement of the clutch disc with the flywheel; providing means for biasing the pressure plate in one of the following directions a) and b): a) towards the clutch disc; b) away from the clutch disc; providing means for actuating the clutch disc; the step of providing the means for actuating further comprising: providing at least one drive connected to an energy accumulator; providing a transfer element; providing at least one adjusting mechanism for the drive to compensate for the axial shift resulting from a change in position of the biasing means; the step of providing the at least one adjusting mechanism further comprises providing an actuating mechanism movable in the direction motion of the drive, a retaining mechanism and a stop for restricting the extension of the actuating mechanism; the method further comprising: moving the actuating mechanism in the direction of the drive and restricting the extension of the actuating mechanism with the retaining mechanism and the stop; maintaining an axial position of the actuating mechanism when there is no wear to the clutch disc; and permitting the actuating means to shift from the axial position to compensate for an axial shift of the biasing means when there is wear to the clutch disc, and maintaining a constant stroke of the actuating mechanism regardless of wear to the clutch disc.

BRIEF DESCRIPTION OF THE DRAWINGS

Various embodiments of the present invention are described in greater detail below with reference to the accompanying drawings, in which:

FIG. 3 shows a section through the system along line III—III in FIG. 1 with a different adjusting mechanism than the one shown in FIGS. 2 and 2a;

FIG. 3a shows an enlarged view Z of the adjusting mechanism shown in FIG. 3;

DESCRIPTION OF THE PREFERRED EMBODIMENT

Figure 1:
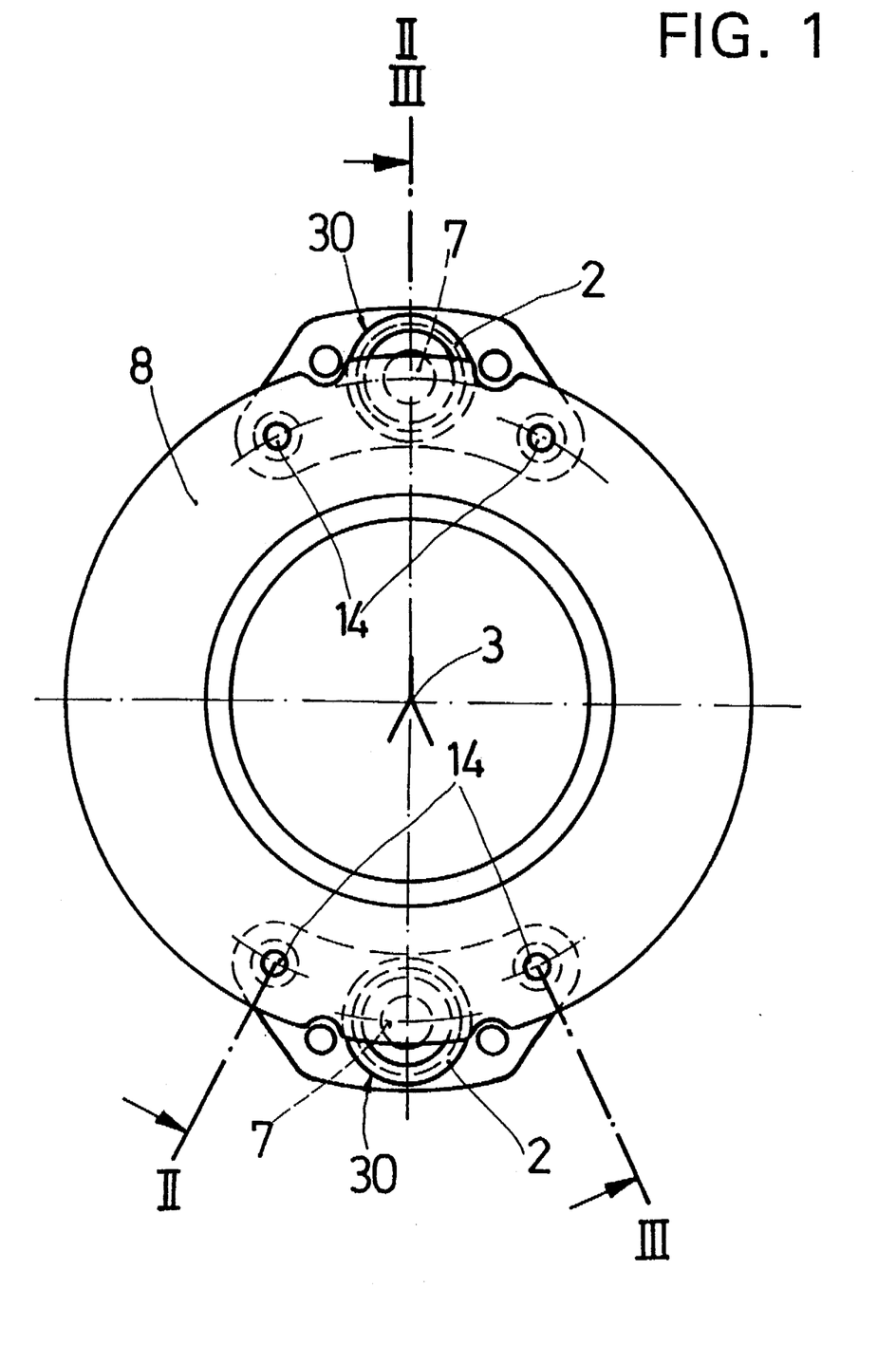
FIG. 1 shows a plan view of a system for engaging and disengaging a friction clutch as seen from its clutch-side end.
Figure 2:
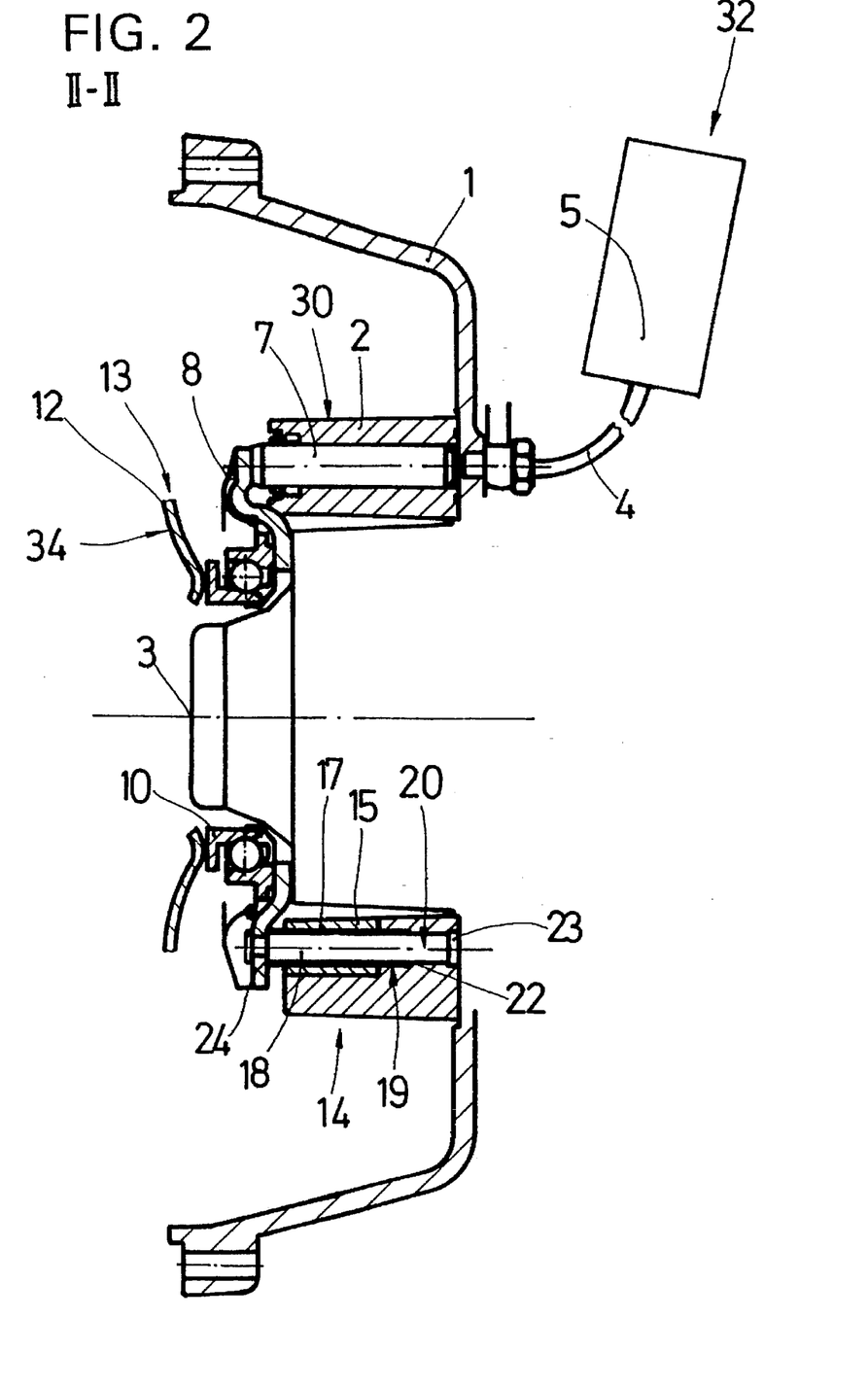
FIG. 2 shows a section through the system of FIG. 1 along Line II—II in FIG. 1, whereby the top half of the drawing shows a cylinder as a drive and the bottom half of the drawing shows an adjusting mechanism.
Figure 2A:
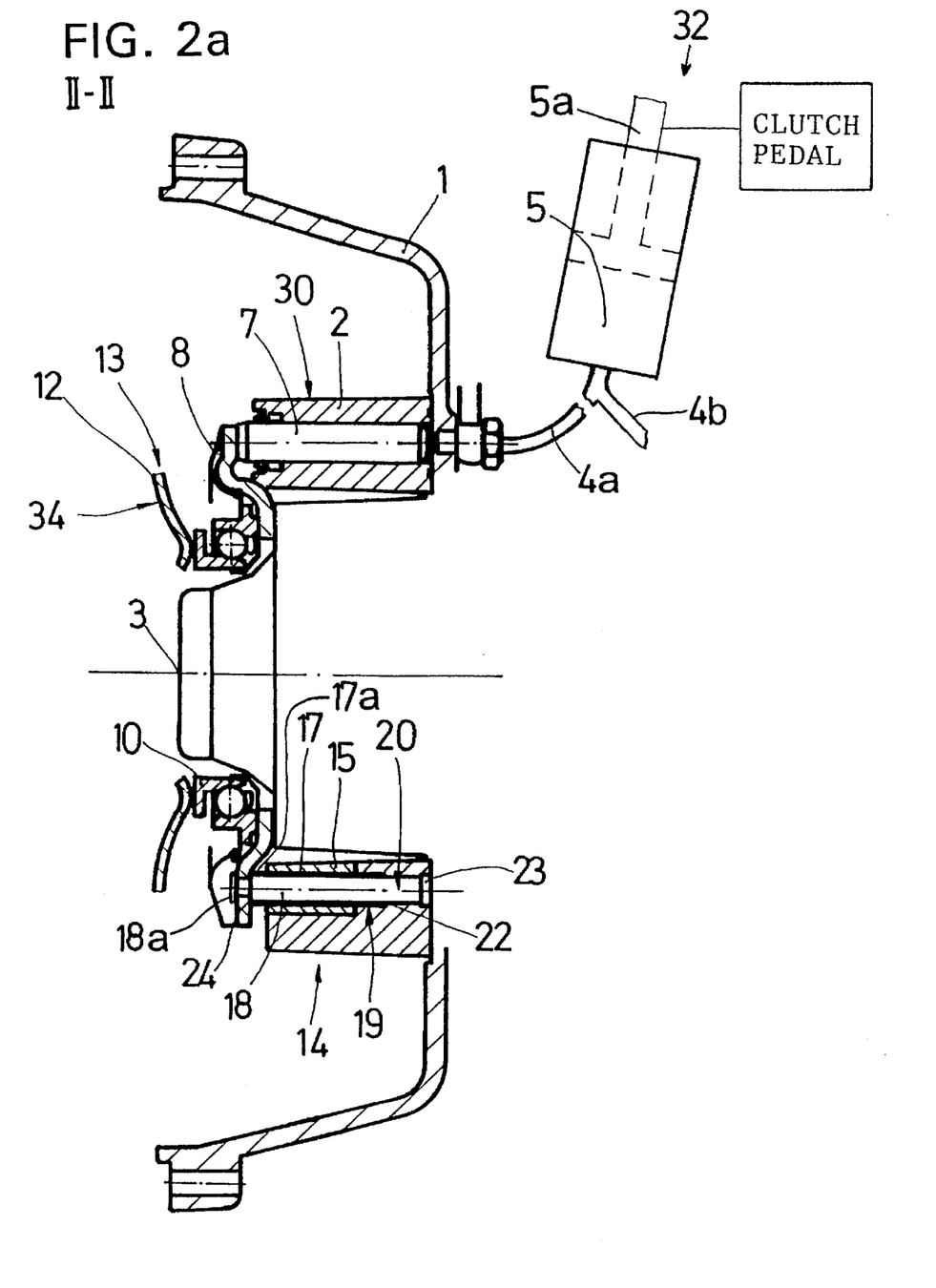
FIG. 2a shows a view similar to that shown in FIG. 2, but shows additional components.
Figures 3, 3A:
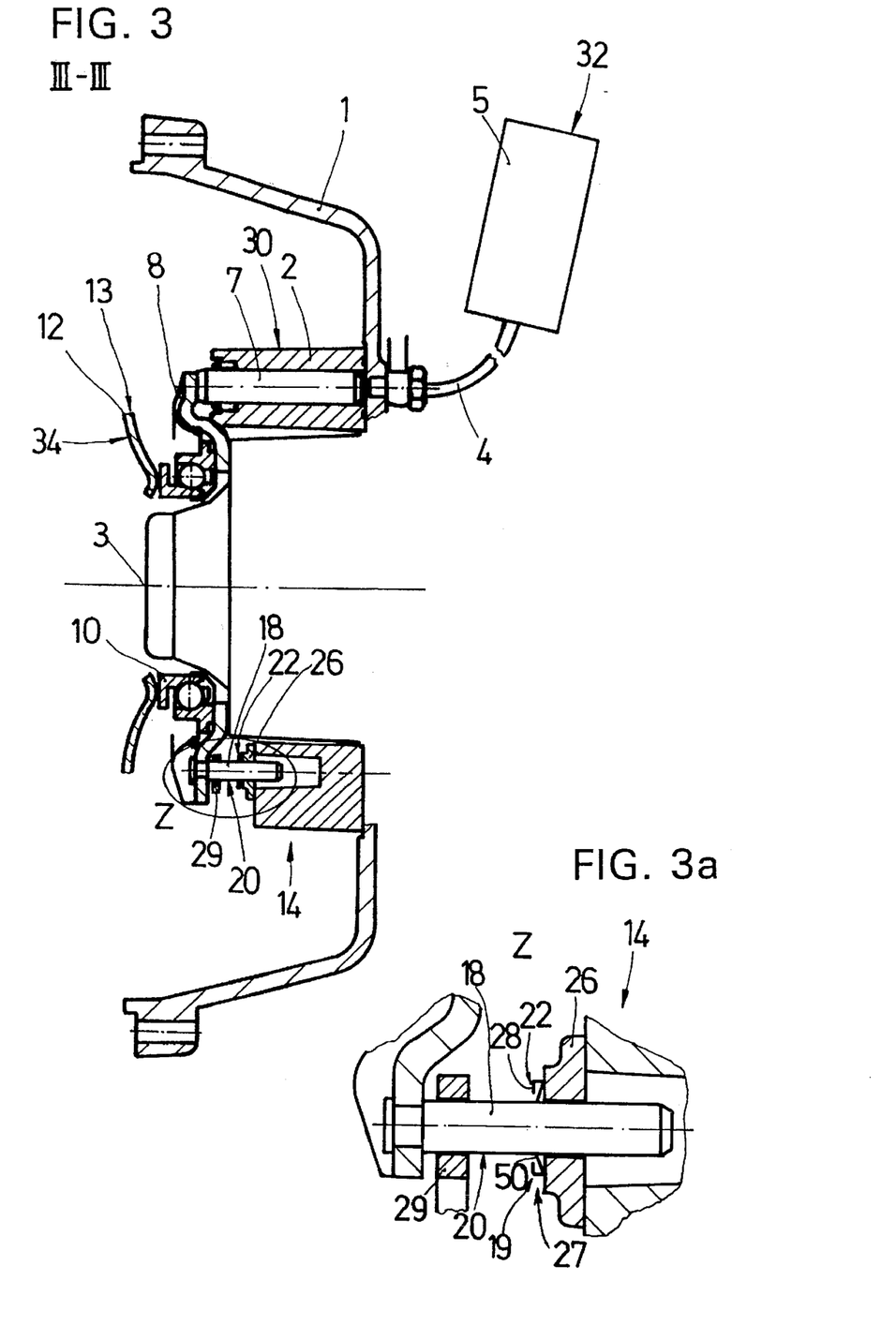
Figures 3B, 3C:
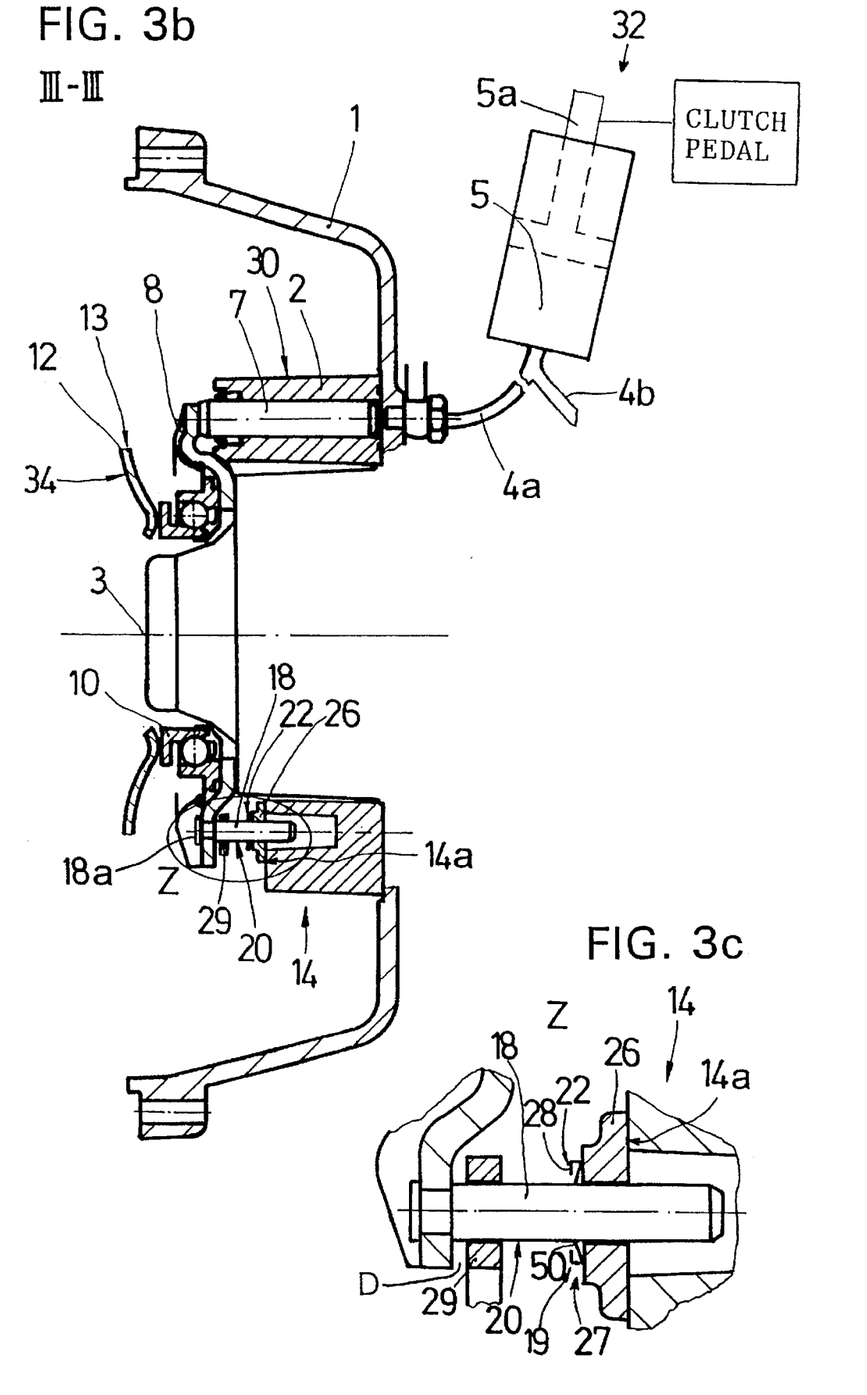
FIGS. 3b and 3c show views similar to that shown in FIGS. 3 and 3a, respectively, but show additional components.

FIG. 1 shows a system for engaging and disengaging a friction clutch, which system can be fastened to a gearbox 1, as can best be seen in FIGS. 2, 2a, 3 and 3b. In accordance with various embodiments of the present invention, the gearbox 1 can possibly be considered to represent one of the following: a clutch housing; a transaxle housing; or a bell housing. The system can generally include as a drive 30, two cylinders 2. The cylinders 2 can essentially be arranged circumferentially offset from one another by about 180°. Further, the cylinders 2 can preferably be disposed at about the same radial distance from a center axis 3 of the clutch system. Each of these cylinders 2 can preferably be connected by means of a hydraulic line 4 to a master cylinder 5, the master cylinder 5 acting as an energy accumulator 32. The master cylinder 5 can be activated by means of a clutch pedal (not shown here but see FIGS. 2a, and 3b. In accordance with one embodiment of the present invention, the master cylinder 5 can preferably have a piston/piston rod assembly 5a and each of the cylinders 2 can preferably be connected to the master cylinder 5 by means of hydraulic lines 4a, 4b as shown in the embodiment of FIG. 2a. The cylinders 2 can each be equipped with a piston 7, which extends axially out of the cylinders 2. On the free end of the piston 7 a transfer element 8 in the form of a circular plate can come to rest. Radially inside the piston 7 and adjacent to a side of the transfer element 8 opposite the side facing the piston 7 there can be a bearing 10, which bearing 10 can be impinged on its side facing away from the transfer element 8 by a spring mechanism, such as a diaphragm plate 12, a membrane spring or disc, or the pressure spring of a friction clutch 13. Pressure springs, membrane springs, and diaphragm plates such as diaphragm plate 12 are generally well known and will not be discussed in any further detail herein.

At least one adjusting mechanism 14 can preferably be located on both sides of each cylinder 2, as shown in FIG. 1, while other arrangements of the adjusting mechanism 14 may also be possible within the scope of the present invention. One such additional arrangement could include four adjusting mechanisms 14 disposed at about 90° with respect to one another, thereby possibly providing a more stable or uniform positioning of the transfer element 8. The adjusting mechanisms 14 can be equipped with a bearing bush 15 (see FIG. 2). Thus, in accordance with one embodiment of the present invention, there can preferably be four adjusting mechanisms 14 in the system, although a lesser number of adjusting mechanisms 14 may be sufficient. A sleeve 17 can preferably be held in the bearing bush 15 by means of friction. The sleeve 17 can provide a non-rigid seating for a pin 18, which pin 18 can be fastened to the transfer element 8 at its end facing away from the gearbox 1. In accordance with one embodiment of the present invention, the pin 18 can preferably be fastened to the transfer element 8 by means of a rivet or screw/bolt 18a (see FIG. 2a) type of fastening. The sleeve 17 can preferably serve as a retaining mechanism 19 for the pin 18, which pin 18 serves as the actuating mechanism 20 of the adjusting mechanism 14. In this regard, the sleeve 17 can have a stop 22 at its end adjacent the gearbox 1 against which stop 22 a radial projection 23 of the pin 18 can come to rest after a predefined pin stroke. By the same token, the pin 18 can be pushed by the diaphragm plate 12, via the transfer element 8, into the adjusting mechanism 14 (i.e. to the right) essentially only to the point where the transfer element 8 comes to rest against the corresponding end of the sleeve 17 which end acts as a stop 24. Thus, in accordance with one embodiment of the invention, the sleeve 17 can preferably have end portions disposed opposite one another which serve as stops 22, 24.

In accordance with one embodiment, the pin 18 can preferably slide axially within the sleeve 17. Further, the sleeve 17 can preferably be disposed in an initial position with respect to the bearing bush 15 as shown in FIGS. 2 and 2a, that is, a portion 17a of the sleeve 17 can extend out of the bearing bush 15. The friction between the sleeve 17 and the bearing bush 15 can preferably hold the sleeve 17 in this initial position as long as there is no wear to the friction surfaces of the friction clutch 13.

In accordance with at least one preferred embodiment of the present invention, the diaphragm plate 12 or membrane disc can preferably be used as an application spring for applying the application force needed to engage a pressure plate of a friction clutch with the clutch disc on one hand, and the clutch disc with a flywheel or counterpressure plate on the other hand. When a diaphragm plate 12 is used, since a diaphragm plate is generally not capable of applying a sufficient application force needed to engage the friction clutch, an engagement mechanism can be provided to supply the additional force needed to engage the friction clutch, by means of the diaphragm plate 12. The present invention can thus provide the engagement force needed to engage the friction clutch.

The system can preferably work as follows in accordance with one preferred method of operation:

By pushing the piston 5a (see FIG. 2a) of the master cylinder 5, preferably into the master cylinder 5, a predefined amount of hydraulic medium can be fed into the cylinders 2, whereby the pistons 7 extend from the cylinders 2, carrying with them the actuating mechanisms 20 by means of the transfer element 8. The extension of the pistons 7 is against the force of the diaphragm plate 12 of the friction clutch 13. The extension of the pistons 7 can preferably be limited by means of the striking of the radial projection 23 of the actuating mechanism 20 against the respective stop 22 of the retaining mechanism 19 or sleeve 17. When the pistons 7 are extended, the contact ends 34 of the diaphragm plate 12 as shown in FIGS. 2 and 2a can be moved to the left, meaning that the friction clutch 13 is now engaged and transfers the torque supplied by an engine to the transmission. To disengage, the piston 5a (see FIG. 2a) of the master cylinder 5 can be retracted, so that the hydraulic medium in the cylinders 2 can be forced out of the cylinders 2 by means of the axial force exerted by the diaphragm plate 12 on the pistons 7 via the bearing 10 and the transfer element 8. The force of the diaphragm plate 12 can cause the pistons 7 to retract into the cylinders 2, whereby the transfer element 8 and the bearing 10 can then be held against the free ends of the pistons 7 by the diaphragm plate 12. The actuating mechanisms 20 can be carried along by means of the transfer element 8 and retracted into the adjusting mechanism 14. Retraction can preferably be limited by the transfer element 8 coming in contact with the stops 24 of the retaining mechanisms 19 or pin sleeves 17.

In accordance with an alternative method of operation of the present invention, the present invention could conceivably be used to disengage the friction clutch 13. By extending the piston 5a into the master cylinder 5, preferably by depressing the clutch pedal (see FIG. 2a) hydraulic medium can be fed into the cylinders 2 and the pistons 7 can extend out of the cylinders 2 to the left, thereby moving the transfer element 8 and the actuating mechanism 20 also to the left. This leftward motion can preferably move the contact ends 34 of the spring 12 to the left in order to disengage the friction clutch 13. To engage the friction clutch 13, the clutch pedal can be released and the piston 5a can be retracted into the master cylinder 5 and the force of the spring 12 on the bearings 10 and the transfer element 8 can move the pistons 7 to preferably force the fluid out of the cylinders 2. Essentially the only difference between the first method of operating as discussed further above and this second method of operating is with regard to the engagement or disengagement of the friction clutch 13 as a result of the leftward movement of the pistons 7, transfer element 8 and bearing 10. Thus, in accordance with this embodiment, it may be possible to disengage the friction clutch 13 by moving the ends 34 of the diaphragm plate 12 to the left.

During this engagement and disengagement movement of the pistons 7 and actuating mechanism 20 (when there is no wear), the retaining mechanisms 19 and thus the stops 22 and 24 can essentially remain stationary. The respective actuating mechanism 20 can thus have an essentially fixed stroke of constant orientation.

It is known that the thickness of the friction surfaces of the friction clutch 13 will decrease due to wear during the operation of the friction clutch 13, which can result in an axial advance of the pressure plate and the diaphragm plate or spring 12. The friction surfaces which can wear in the friction clutch 13 will typically be the friction linings disposed on the clutch disc. This wearing of the friction surfaces can result in a reduction in the axial force exerted on the pistons 7 and cylinders 2 by the diaphragm plate 12 via the bearing 10 and the transfer element 8. When this occurs, the pistons 7 essentially do not encounter the same counter-pressure from the plate 12 when the hydraulic medium from the master cylinder 5 flows into the cylinders 2, for example during an engagement process. As a result, the axial force exerted on the pistons 7 of the cylinders 2 by the hydraulic medium, as the piston 5a extends into the master cylinder 5, can exceed the retaining force prevailing between the bearing 15 of the adjusting mechanism 14 and the retaining mechanism 19 or sleeve 17 due to friction. This can thereby cause the retaining mechanism 19 to move in the axial direction after breaking the positive friction interlock with the bearing bush 15. The axial shift can proceed until the wear-dependent leftward axial shift of the diaphragm plate 12 has been offset, and the diaphragm plate 12 again exerts the accustomed counter-pressure force against the bearing 10. In this new position of the retaining mechanism 19, the retaining mechanism 19 can again permit the stroke of the actuating mechanism 20, whereby the orientation of this stroke has been shifted in the direction of the friction clutch 13 by a distance corresponding to the wear-dependent axial displacement of the plate 12.

In other words, and in accordance with one embodiment of the present invention, when there is wear to the friction surfaces of the friction clutch 13, the force of the hydraulic medium can preferably cause the pistons 7 to extend further to the left than when there was no wear. The pins 18 would thus essentially move in the axial direction to the left along with the pistons 7, and when the stop 23 of the pin 18 abuts the stop 22 of the sleeve 17, the sleeve 17 can preferably move along with the pin 18 to the left by the amount of the wear, until the force of the plate 12 is again exerted on the bearing 10 and pistons 7. Thus, after wear of the friction surfaces, the end 17a (see FIG. 2a) of the sleeve 17 will preferably project from the bearing bush 15 more than that shown in FIGS. 2 and 2a (which FIGS. 2 and 2a could be understood as showing the condition when there is no wear to the friction surfaces of the clutch 13). Further, the pistons 7, the transfer element 8 and the bearing 10 will preferably be shifted to the left by the amount of the wear.

The retaining mechanism 19 can be effectively prevented from returning to its initial position by means of the retaining force between the bearing bush 15 and the retaining mechanism 19 due to friction, since the diaphragm plate 12 effective in the direction of return movement essentially cannot apply sufficient axial force to overcome this retaining force. Accordingly, the disengagement system can essentially only make adjustments in the direction of wear of the friction clutch 13, whereby a constant stroke of the pistons 7 and actuating mechanism 20 can be achieved independent of the respective state of wear of the friction clutch 13.

FIGS. 3, 3a, 3b and 3c show an adjusting mechanism 14 having a different design than that shown in FIGS. 2 and 2a. The embodiments shown in FIGS. 3–3c can preferably include a plate 26, against which plate 26 a spring 27 can be disposed. The spring 27 can preferably have a disk-shaped web 50, which web 50 can extend radially outward from the actuating mechanism 20. The outer edge of the web 50 can be inclined or angled toward the plate 26 and can be equipped with a radially inward-facing projection 28. The spring 27 can be fastened and wedged against the pin 18, which pin 18 preferably serves as the actuating mechanism 20. Further, there can also be a stop 29 disposed adjacent the transfer element 8, which stop 29 is preferably stationary. In accordance with at least one embodiment of the present invention, the spring 27 can preferably be fastened to the plate 26.

The embodiment of the adjusting mechanism 14 depicted in FIGS. 3, 3a, 3b, and 3c can preferably function as follows: To engage and disengage, the actuating mechanism 20 can be moved in the axial direction, carrying with it the plate 26 and the spring 27, until the projection 28 of the spring 27 makes contact with the stop 29. The stop 29 can preferably be stationary in the adjusting mechanism 14 and can act similarly to the stop 22 shown in FIGS. 2 and 2a, to limit the extension of the actuating mechanism 20 to the left in the drawing. The retraction of the actuating mechanism 20 can preferably be limited in the rightward direction by the plate 26 and the spring 27, wherein the plate 26 strikes a stationary portion 14a (see FIGS. 3b and 3c) of the housing of the adjusting mechanism 14 and the configuration of the spring 27 can essentially prohibit displacement of the pin 18 therethrough as discussed further below.

As a result of the wear-dependent axial shift of the diaphragm plate 12 in the left direction as discussed above, the hydraulic medium flowing into the cylinders 2 via the master cylinder 5 can place an axial load on the pistons 7, the transfer element 8, and the clutch bearing 10, but the counter-pressure exerted by the diaphragm plate 12 decreases due to the wear of the friction clutch 13. As previously explained, an axial force arises preferably due to the extension of the piston 5a of the master cylinder 5, which force preferably causes the actuating mechanism 20, as soon as the actuating mechanism 20 is moved to its left limit position wherein the spring 27 rests with its projection 28 against the stop 29, to be displaced in the direction of the friction clutch 13. Thus, the spring 27, which acts as the retaining mechanism 19 during engagement and disengagement, moves within its range of action with the actuating mechanism 20 by moving the disk-shaped web 50 radially inward toward the stop 29, thus permitting the actuating mechanism 20 to slip through opposite the spring 27 resting against the stop 29. This movement of the actuating mechanism 20 can preferably permit an axial displacement of the actuating mechanism 20 over a distance corresponding to the wear-dependent axial shift of the diaphragm plate 12. As soon as the force relationship between the cylinders 2 and the pressure spring 12 that existed prior to the occurrence of wear is restored, the movement of the actuating mechanism 20 comes to a stop and thus is in its new position from which it performs its predetermined stroke as it originally did when there was no wear, which stroke is axially displaced compared to the previous stroke, however. The spring 27 and the plate 26 now again act as stationary elements on the actuating mechanism 20, whereby the spring 27 prevents the actuating mechanism 20 from returning to its initial position in that the inclination of its disk-shaped web 50 radially limits the movement of the actuating mechanism 20 in this direction and would thus become more tightly wedged against the actuating mechanism 20.

In other words, and in accordance with one embodiment of the present invention, when there is wear to the friction clutch 13 and the diaphragm plate 12 is shifted axially to the left in the drawing, the hydraulic medium flows into the cylinders 2 and causes the pistons 7 to extend. Since less pressure is on the pistons 7 (via the diaphragm plate 12), the pistons 7 can extend further to the left than they did when there was no wear. The actuating mechanism 20 can preferably move along with the pistons 7 and when the projection 28 abuts the stop 29, the spring 27 can preferably permit the pin 18 to slip through the plate 26 while the pin 18 is moving in the left direction in the drawing. Thus, the spring 27 and the plate 26 can be held stationary against the stop 29 while the pin 18 slips through the plate 26. The pin 18 can preferably slide through the plate 26 by the amount of wear, until the original pressure of the diaphragm plate 12 is restored. The pin 18 can now preferably have a new position with respect to the stop 29, and, in accordance with one embodiment, the distance D shown in FIG. 3c can preferably be larger after the adjustment for the wear is made by the pin 18. Thus, the distance D should increase by the amount of the wear. When the piston 5a is retracted and the fluid leaves the cylinders 2 and the pistons 7 and the pine 18 move to the right, the pins 18 can preferably be stopped in the rightward movement by the plate 26 abutting the housing portion 14a. As the pin 18 moves to the right and as the plate 26 contacts the stationary portion of the housing 14a, the spring 27 can preferably become more tightly wedged in the radial direction against the pin 18. Thus, as the pin 18 moves to the right and abuts the housing portion 14a, the spring 27 can serve to "lock" the pin 18 into its new position.

Figure 4:
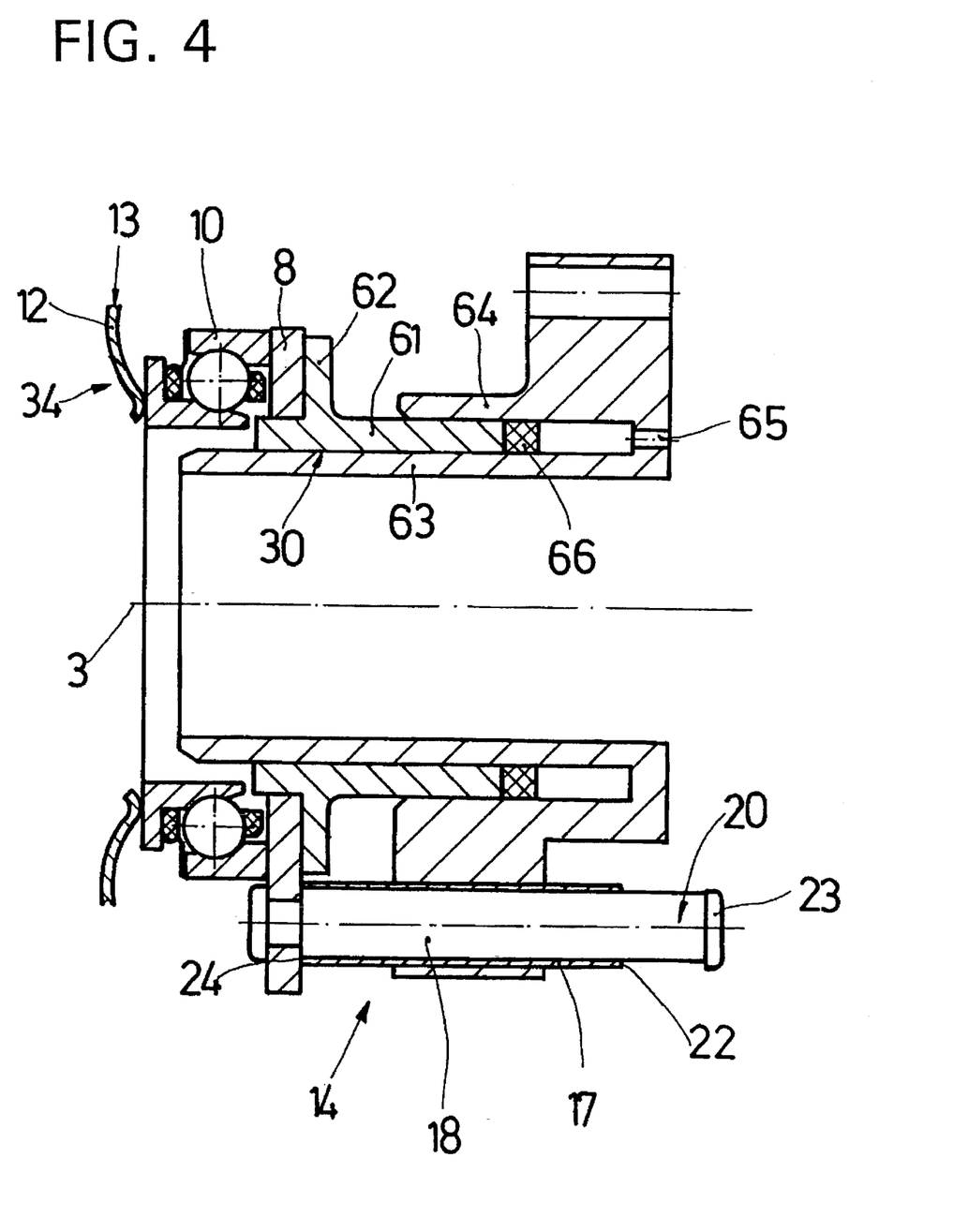
FIG. 4 shows an adjusting mechanism similar to that shown in FIGS. 2 and 2a but which is actuated by means of a drive concentrically enclosing the center axis.
Figure 4A:
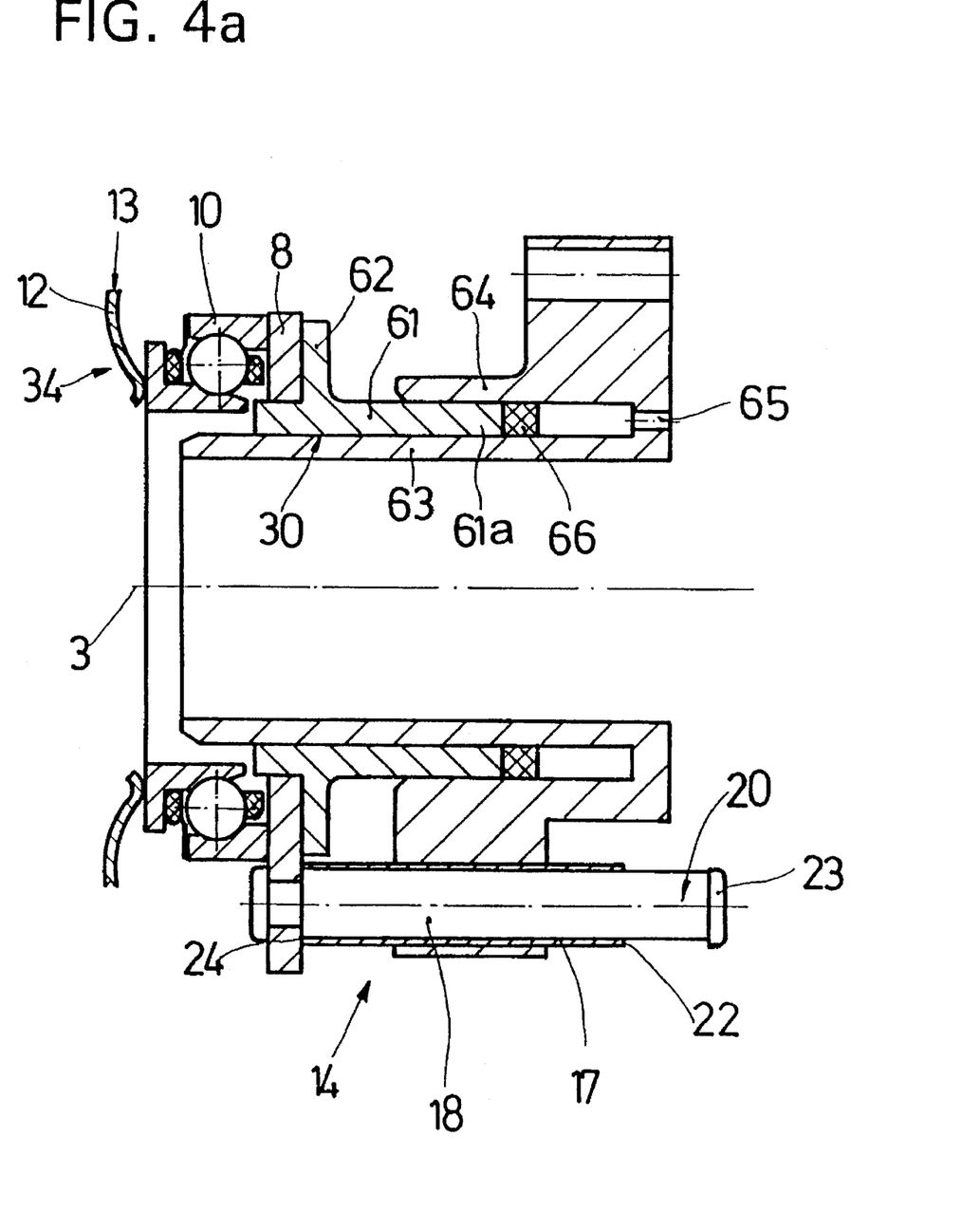
FIG. 4a shows a view similar to that shown in FIG. 4, but shows additional components.

FIGS. 4 and 4a show an adjusting mechanism 14 similar to that shown in FIGS. 2 and 2a, whereby unlike in FIGS. 2 and 2a, the transfer element 8 can be displaced axially by means of a piston 61 which encircles the center axis 3. The piston 61 can preferably be part of a concentric engagement or disengagement mechanism which acts via a radial bell 62 on that side of the transfer element 8 facing away from the bearing 10. In accordance with one embodiment, the radial bell 62 can preferably be a radial projection of the piston 61. The piston 61 can be movably mounted between an inside cylinder wall 63 and an outside cylinder wall 64. Upon entering from a hydraulic medium feed line 65, hydraulic medium, supplied from a master cylinder 5 as shown in FIGS. 2 and 2a, causes the piston 61 to extend, whereby a loss of hydraulic medium is prevented by means of a seal 66 adjacent to the axial end of the piston 61 opposite the hydraulic medium feed line 65. In other words, and in accordance with one embodiment, the seal 66 can be disposed between one end 61a (see FIG. 4a) of the piston 61 and the feed line 65. The end 61a the piston 61 can preferably be disposed adjacent the feed line 65.

The adjusting mechanism 14 shown in FIGS. 4 and 4a can preferably function in essentially the same manner as previously described with reference to FIGS. 2 and 2a and need not be discussed in greater detail here.

As the pistons 7, 61 move further and further to the left due to the wear of the friction clutch 13 and due to the adjustments made by the adjusting mechanisms 14 as discussed above with regard to the embodiments shown in FIGS. 1–4a, in accordance with one embodiment, there can preferably be space within the cylinders 2 which the pistons 7, 61 will not occupy due to their leftward axial shift. Since the diaphragm plate 12 essentially can't overcome the adjustment made by the adjusting mechanisms 14, as discussed above, it is conceivable that some fluid can remain in these spaces within the cylinders 2 after the pistons 7, 61 are pushed to the right by the diaphragm plate 12.

Thus, the diaphragm plate 12 can essentially only push the pistons 7, 61 so far to the right. This amount of fluid remaining in the spaces unoccupied by the pistons 7, 61 can conceivably be negligible with respect to the amount of fluid in the master cylinder 5, however, so that additional fluid would typically not need to be supplied to the master cylinder 5 from a reservoir, etc.

Some examples of clutch assemblies and various components associated therewith which could possibly utilize the present invention may be disclosed in the following U.S. Pat. Nos. 4,684,007 to Maucher, entitled "Clutch Plate"; 4,635,780 to Wiggan, entitled "Clutch Disc for a Motor Vehicle Friction Clutch"; 4,651,857 to Schraut et el., entitled "Clutch Disc Unit for a Motor Vehicle Friction Clutch"; 5,103,688 to Kuhne, entitled "Two-mass Flywheel"; and 4,777,843 to Bopp, entitled "Two-mass Flywheel Assembly With Viscous Damping Assembly".

Some examples of hydraulic clutch systems which would possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Types of clutch assemblies having pedal linkages which could be utilized in accordance with the present invention may be disclosed in the following U.S. Pat. Nos. 4,987,983 to Adams, dated Jan. 29, 1991, entitled "Dual-mode Powered Clutch Actuator"; 5,139,126 to Perez, dated Aug. 18, 1992, entitled "Control Device for a Clutch, In Particular for an Automotive Vehicle"; and 5,217,097 to Lasoen, dated Jun. 8, 1993, entitled "Control System for a Fluid Pressure Operated Clutch".

Hydraulic braking systems which could also possibly utilize the present invention may be disclosed in the following U.S. Pat. Nos.: 4,634,190 to Wupper, entitled "Hydraulic Brake System With Slip Control"; 4,643,488 to Reinartz, entitled "Hydraulic Vehicle Servo Brake"; 4,643,489 to Reinarts et el., entitled "Hydraulic Brake System With Slip Control"; 4,656,833 to Belart, entitled "Hydraulic Brake System for Automotive Vehicles"; and 4,902,077 to Belart et el., entitled "Hydraulic Brake System".

One feature of the invention resides broadly in the system for engaging and diSengaging, in particular for an automobile friction clutch, with at least one drive which is connected to an energy accumulator and is intended to move against the force of a spring mechanism of a friction clutch, whereby the drive acts upon a transfer element, characterized by the fact that there is at least one adjusting mechanism 14 for the drive 30 to compensate for the axial shift resulting from the change in length of the spring mechanism 34 due to wear on the friction clutch 13, which adjusting mechanism includes an actuating mechanism 20, which can be moved in the direction of motion of the drive, and a retaining mechanism 19, which restricts the extension of the actuating mechanism by means of an associated stop 21 and which by means of a retaining force secures the orientation of the stroke of the actuating mechanism 20 against an axial displacement of a distance corresponding to the axial shift until such an axial shift occurs due to wear that a reduction in the force of the spring mechanism 34 acting against the actuation force applied by the energy accumulator 32 results in the generation of an axial force which exceeds the magnitude of the retaining force.

Another feature of the invention resides broadly in the system characterized by the fact that the retaining mechanism 19 permits movement of the actuating mechanism as a result of the actuating force to compensate for the axial shift wear-dependent axial shift, but movement in the opposite direction can be prevented.

Yet another feature of the invention resides broadly in the system characterized by the fact that the transfer element 8 interacts on the clutch-side end of the actuating mechanism with a stop 24; 29 to limit the retraction depth of the actuating mechanism 20 into the adjusting mechanism 14.

Still another feature of the invention resides broadly in the system characterized by the fact that the retaining mechanism 19 acts as a stationary part of the adjusting mechanism 14 and the stop 22 can be moved relative to a bearing 15 of the adjusting mechanism 14 if the retaining force is exceeded by the axial force.

A further feature of the invention resides broadly in the system characterized by the fact that the retaining mechanism 19 is connected by means of a positive interlock to the stop 22 to produce the retaining force for the same.

Another feature of the invention resides broadly in the system characterized by the fact that the retaining mechanism 19 encloses a sleeve 17 having a stop 22, the inside of which sleeve serves as a guide for the actuating mechanism 20 as it moves to engage or disengage.

Yet another feature of the invention resides broadly in the system characterized by the fact that the actuating mechanism 20 has on its transmission-side end a radial projection 23 which can be brought into contact with the stop 22 to limit the distance that the actuating mechanism 20 extends out from the adjusting mechanism 14 when engaging or disengaging.

Still another feature of the invention resides broadly in the system characterized by the fact that the retaining mechanism 19 is mounted in the adjusting mechanism in such a manner so as to follow the actuating device 20 as it moves and so as to come in contact with the stop 22 realized as fixed part of the adjusting mechanism 14 at the maximum extension of the actuating mechanism 20 when disengaging.

A further feature of the invention resides broadly in the system characterized by the fact that the retaining mechanism 19 can, by means of an axial force acting on the actuating mechanism 20 in the event of an axial shift due to wear, be drifted radially to permit the actuating mechanism 20 to pass as soon as the retaining mechanism comes in contact with the stop 22 while tracking the actuating mechanism 20.

Another feature of the invention resides broadly in the system characterized by the fact that the retaining mechanism 19 is realized as an elastic element 27 mounted by means of a positive interlock on the actuating mechanism 20.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 14 684.1, filed on Apr. 27, 1994, having inventors Achim Link and Reinhold Weidinger, and DE-OS P 44 14 684.1 and DE-PS P 44 14 are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A clutch assembly for a motor vehicle, said clutch assembly comprising a clutch, said clutch comprising:
   a flywheel defining an axis of rotation and an axial direction parallel to the axis of rotation;
   a clutch disc;
   said clutch disc comprising friction lining means;
   a pressure plate for applying an axially directed force to said clutch disc to engage said clutch disc with said flywheel;
   said clutch disc being disposed between said flywheel and said pressure plate;
   spring means for biasing said pressure plate, said spring means having a radially inner portion disposed adjacent the axis of rotation;
   means for engaging and disengaging said clutch, said means for engaging and disengaging being disposed adjacent said radially inner portion of said spring means;
   said means for engaging and disengaging being disposed to apply force to said radially inner portion of said spring means;
   said means for engaging and disengaging being disposed to make contact with said radially inner portion of said spring means for engaging and disengaging said clutch;
   said means for engaging and disengaging having a stroke to engage and disengage said clutch;
   said means for engaging and disengaging comprising:
      means for moving said spring means from an engaged position, wherein said friction lining means are engaged and in contact with said pressure plate and said flywheel, and a disengaged position, wherein said friction lining means are disengaged from said pressure plate and said flywheel;
      a stop;
      said stop being disposed and configured to restrict said stroke of said means for engaging and disengaging;
      means for providing a force for retaining said stop in a first position during engagement and disengagement of said clutch, until wear of said friction lining means occurs;
      means for moving said stop from said first position upon wear of said friction lining means, to compensate for wear of said friction lining means, by overcoming the retaining force of said means for providing a force; and
      said means for moving said stop being disposed in relation to, and operatively connected to, said spring means in such a manner as to move said stop upon a change in a parameter of said spring means, said parameter changing upon wear of said friction lining means.

2. The clutch assembly according to claim 1 wherein:
   said means for moving said stop comprises at least one drive mechanism, said at least one drive mechanism comprising:
      a cylinder; and
      a piston slidably disposed within said cylinder;
   said stop is disposed immediately adjacent said at least one drive mechanism.

3. The clutch assembly according to claim 2 wherein:
   said stroke of said means for engaging and disengaging has a first direction towards said clutch disc and a second direction opposite said first direction;
   said stop being disposed and configured to restrict said stroke of said means for engaging and disengaging in said first direction;
   said stop being a first stop; and
   said means for engaging and disengaging further comprising a second stop, said second stop being disposed and configured to restrict said stroke of said means for engaging and disengaging in said second direction.

4. The clutch assembly according to claim 3 wherein:
   said means for moving said spring means comprises a transfer element, said transfer element being operatively connected to said piston; and
   said transfer element contacts said second stop to restrict said stroke of said means for engaging and disengaging in said second direction.

5. The clutch assembly according to claim 4 wherein:
   said means for engaging and disengaging further comprises a pin, said pin having a first end and a second end disposed a substantial distance from one another; and
   said first end of said pin being connected to said transfer element such that said pin is movable along with said transfer element and said piston.

6. The clutch assembly according to claim 5 wherein said force characteristic of said spring means is a force-displacement characteristic.

7. The clutch assembly according to claim 6 wherein said means for providing a force for retaining said first stop in said first position comprises:
   a sleeve, said sleeve being disposed about said pin, said pin being movable with respect to said sleeve;
   said sleeve having an interior portion configured for guiding said pin during movement of said pin;
   said sleeve comprising said first stop;
   bearing means, said bearing means disposed about said sleeve, said sleeve and said bearing means being configured for frictionally engaging one another; and
   said sleeve and said first stop being substantially stationary with respect to said bearing means until wear of said friction lining means occurs.

8. The clutch assembly according to claim 7 wherein:
   said means for moving said stop further comprises a projecting portion disposed on said second end of said pin, said projecting portion extending radially outwardly from said pin;
   said projecting portion contacting said first stop to restrict said stroke of said pin in said first direction and to limit movement of said pin out of said sleeve and said bearing means until wear of said friction lining means has occurred; and
   said projecting portion being configured to contact said first stop and move said first stop and said sleeve with respect to said bearing means from said first position towards said clutch disc, upon wear of said friction lining means.

9. The clutch assembly according to claim 8 wherein:
   said sleeve has a first end and a second end disposed a substantial distance away from one another;
   said first end of said sleeve comprises said first stop;
   said second end of said sleeve comprises said second stop;
   said means for moving said spring means further comprises a bearing, said bearing being disposed between said transfer element and said spring means;
   said bearing contacts said spring means;
   said cylinder being configured for containing hydraulic fluid;
   said means for moving said stop further comprises a master cylinder, said master cylinder being in fluid communication with said cylinder;

said first direction of said stroke being an engaging direction for engaging said clutch; and said second direction of said stroke being a disengaging direction for disengaging said clutch.

10. The clutch assembly according to claim 6 wherein:

said spring means is a first spring means;

said means for providing a force for retaining said first stop in said first position comprises:

second spring means, said second spring means being disposed about said pin;

said second spring means comprising said first stop; and said second spring means being movable along with said pin in said first and second directions.

11. The clutch assembly according to claim 10 wherein said second spring means is fastened to said pin in an interlocking manner, said second spring means having means for permitting movement of said pin with respect to said spring means in said first direction only upon wear of said friction lining means, and for preventing movement of said pin with respect to said second spring means in said second direction.

12. The clutch assembly according to claim 11 wherein:

said first stop of said second spring means is configured to contact said second stop during movement of said pin in said first direction at least upon wear of said friction lining means;

said at least one drive mechanism being configured for moving said second spring means and said first stop with respect to said pin from said first position upon wear of said friction lining means, and upon said first stop contacting said second stop; and said means for permitting movement of said second spring means comprises a radially movable web portion, said radially movable web portion being movable in a direction away from said pin to permit said pin to move with respect to said second spring means upon wear of said friction lining means.

13. The clutch assembly according to claim 12 wherein:

said second stop is disposed between said first stop and said transfer element, said second stop being stationary with respect to said pin;

said means for engaging and disengaging further comprises:

a plate disposed about said pin and being in contact with said second spring means;

said plate being movable along with said pin and said second spring means;

a stationary portion, said stationary portion being disposed adjacent said plate and being stationary with respect to said pin;

said stationary portion being disposed and configured to restrict movement of said pin in said second direction;

said first direction of said stroke being an engaging direction to engage said clutch;

said second direction of said stroke being a disengaging direction to disengage said clutch;

said means for moving said spring means further comprises a bearing, said bearing being disposed between said transfer element and said spring means;

said bearing contacts said spring means;

said cylinder being configured for containing hydraulic fluid; and said means for moving said stop further comprises a master cylinder, said master cylinder being in fluid communication with said cylinder.

14. A method of operating a clutch assembly for a motor vehicle, said clutch assembly comprising a clutch, said clutch comprising: a flywheel defining an axis of rotation and an axial direction parallel to the axis of rotation; a clutch disc; said clutch disc comprising friction lining means; a pressure plate for applying an axially directed force to said clutch disc to engage said clutch disc with said flywheel; said clutch disc being disposed between said flywheel and said pressure plate; spring means for biasing said pressure plate, said spring means having a radially inner portion disposed adjacent the axis of rotation; means for engaging and disengaging said clutch, said means for engaging and disengaging being disposed adjacent said radially inner portion of said spring means; said means for engaging and disengaging being disposed to apply force to said radially inner portion of said spring means; said means for engaging and disengaging being disposed to make contact with said radially inner portion of said spring means for engaging and disengaging said clutch; said means for engaging and disengaging having a stroke to engage and disengage said clutch; said means for engaging and disengaging comprising: means for moving said spring means from an engaged position, wherein said friction lining means are engaged and in contact with said pressure plate and said flywheel, and a disengaged position, wherein said friction lining means are disengaged from said pressure plate and said flywheel; a stop; said stop being disposed and configured to restrict said stroke of said means for engaging and disengaging; means for providing a force for retaining said stop in a first position during engagement and disengagement of said clutch, until wear of said friction lining means occurs; means for moving said stop from said first position upon wear of said friction lining means, to compensate for wear of said friction lining means, by overcoming the retaining force of said means for providing a force; and said means for moving said stop being disposed in relation to, and operatively connected to, said spring means in such a manner as to move said stop upon a change in a parameter of said spring means, said parameter changing upon wear of said friction lining means; said method comprising the steps of:

providing a flywheel defining an axis of rotation and an axial direction parallel to the axis of rotation;

providing a clutch disc;

said step of providing said clutch disc comprising providing friction lining means;

providing a pressure plate for applying an axially directed force to said clutch disc to engage said clutch disc with said flywheel;

providing spring means for biasing said pressure plate, said spring means having a radially inner portion disposed adjacent the axis of rotation;

providing means for engaging and disengaging said clutch, said means for engaging and disengaging being disposed adjacent said radially inner portion of said spring means;

said step of providing said means for engaging and disengaging further comprising:

providing means for moving said spring means from an engaged position, wherein said friction lining means are engaged and in contact with said pressure plate and said flywheel, and a disengaged position, wherein said friction lining means are disengaged from said pressure plate and said flywheel;

providing a stop;

providing means for providing a force for retaining said stop in a first position during engagement and disengagement of said clutch, until wear of said friction lining means occurs; and providing means for moving said stop from said first position upon wear of said friction lining means, to compensate for wear of said friction lining means, by overcoming the retaining force of said means for providing a force;

said method of operating comprising the steps of:

applying force to said radially inner portion of said spring means with said means for engaging and disengaging;

contacting said radially inner portion of said spring means with said means for engaging and disengaging to engage and disengage said clutch;

biasing said pressure plate with said spring means;

applying an axially directed force, with said pressure plate, to said clutch disc to engage said clutch disc with said flywheel;

moving, with said means for moving said spring means, said spring means from an engaged position, wherein said friction lining means are engaged and in contact with said pressure plate and said flywheel, and a disengaged position, wherein said friction lining means are disengaged from said pressure plate and said flywheel;

restricting, with said stop, said stroke of said means for engaging and disengaging;

providing a force, with said means for providing a force, and retaining said stop in a first position during engagement and disengagement of said clutch, until wear of said friction lining means occurs;

moving, with said means for moving said stop, said stop from said first position upon wear of said friction lining means, and compensating for wear of said friction lining means, by overcoming the retaining force of said means for providing a force; and moving, with said means for moving said stop, said stop upon a change in a parameter of said spring means, said parameter changing upon wear of said friction lining means.

15. The method according to claim 14 wherein:

said step of providing said means for moving said stop further comprises providing at least one drive mechanism, said stop being disposed immediately adjacent said at least one drive mechanism; and said step of providing said at least one drive mechanism further comprising:
providing a cylinder; and
providing a piston slidably disposed within said cylinder.

16. The method according to claim 15 wherein said stroke of said means for engaging and disengaging has a first direction towards said clutch disc and a second direction opposite said first direction and further wherein said stop is a first stop, said method further comprising:

restricting, with said stop, said stroke of said means for engaging and disengaging in said first direction;

said step of providing said means for engaging and disengaging further comprises providing a second stop; and restricting, with said second stop, said stroke of said means for engaging and disengaging in said second direction.

17. The method according to claim 14 wherein:

said step of providing said means for moving said spring means further comprises providing a transfer element, said transfer element being operatively connected to said piston;

said step of providing said means for engaging and disengaging further comprises providing a pin, said pin having a first end and a second end disposed a substantial distance from one another, said first end of said pin being connected to said transfer element;

said method further comprises:

contacting said second stop with said transfer element and restricting said stroke of said means for engaging and disengaging in said second direction; and moving said pin along with said transfer element and said piston.

18. The method according to claim 17 wherein said step of moving said stop upon a change in force characteristic of said spring means further comprises moving, with said means for moving said stop, said stop upon a change in a force-displacement characteristic of said spring means.

19. The method according to claim 18 wherein:

said step of providing said means for providing a force for retaining said first stop in said first position further comprises:

providing a sleeve, said sleeve being disposed about said pin, said pin being movable with respect to said sleeve;

providing said sleeve with an interior portion configured for guiding said pin during movement of said pin;

said sleeve comprises said first stop;

providing bearing means, said bearing means being disposed about said sleeve;

said step of providing said means for moving said stop further comprises providing a projecting portion disposed on said second end of said pin, said projecting portion extending radially outwardly from said pin;

said step of providing said sleeve further comprises providing said sleeve with a first end and a second end disposed a substantial distance away from one another, said first end of said sleeve comprising said first stop and said second end of said sleeve comprising said second stop;

said step of providing said means for moving said spring means further comprises providing a bearing, said bearing being disposed between said transfer element and said spring means;

said step of providing said cylinder further comprises providing said cylinder with hydraulic fluid;

said step of providing said means for moving said stop further comprises providing a master cylinder, said master cylinder being in fluid communication with said cylinder; said method further comprises:

frictionally engaging said sleeve with said bearing means such that said sleeve and said first stop are substantially stationary with respect to said bearing means, until wear of said friction lining means occurs;

contacting said first stop with said projecting portion and restricting said stroke of said pin in said first direction, and limiting movement of said pin out of said sleeve and said bearing means, until wear of said friction lining means has occurred; and contacting said first stop with said projecting portion and moving said first stop and said sleeve with respect to said bearing means from said first position towards said clutch disc, upon wear of said friction lining means;

contacting said spring means with said bearing;

moving said engaging and disengaging means in said first direction of said stroke and engaging said clutch; and moving said engaging end disengaging means in said second direction of said stroke and disengaging said clutch.

20. The method according to claim 18 wherein:

said spring means is a first spring means;

said second stop is disposed between said first stop and said transfer element, said second stop being stationary with respect to said said step of providing said means for providing a force for retaining said first stop in said first position further comprises:

providing second spring means, said second spring means being disposed about said pin;

said second spring means comprising said first stop;

said second spring means is fastened to said pin in an interlocking manner;

said step of providing said second spring means further comprises providing said second spring means with means for permitting movement of said pin with respect to said spring means in said first direction only upon wear of said friction lining means, and for preventing movement of said pin with respect to said second spring means in said second direction;

said step of providing said means for permitting movement of said second spring means further comprises providing a radially movable web portion;

said step of providing said means for engaging and disengaging further comprises:

providing a plate disposed about said pin;

providing a stationary portion, said stationary portion being disposed adjacent said plate and being stationary with respect to said pin;

said step of providing said means for moving said spring means further comprises providing a bearing, said bearing being disposed between said transfer element and said spring means;

said step of providing said cylinder further comprises providing said cylinder with hydraulic fluid;

said step of providing said means for moving said stop further comprises providing a master cylinder, said master cylinder being in fluid communication with said cylinder;

said method further comprises:

moving said second spring means along with said pin in said first and second directions;

permitting movement, with said means for permitting movement, of said pin with respect to said spring means in said first direction only upon wear of said friction lining means, and preventing movement of said pin with respect to said second spring means in said second direction;

contacting said second stop with said first stop of during movement of said pin in said first direction at least upon wear of said friction lining means;

moving, with said at least one drive mechanism, said second spring means and said first stop with respect to said pin from said first position upon wear of said friction lining means, and upon said first stop contacting said second stop;

moving said radially movable web portion in a direction away from said pin and permitting said pin to move with respect to said second spring means upon wear of said friction lining means;

contacting said second spring means with said plate;

moving said plate along with said pin and said second spring means;

restricting movement of said pin, with said stationary portion, in said second direction;

moving said engaging and disengaging means in said first direction of said stroke and engaging said clutch;

moving said engaging and disengaging means in said second direction of said stroke and disengaging said clutch; and contacting said bearing with said spring means.

* * * * *

UNITED STATES PATENT AND TRADEMARK OFFICE
CERTIFICATE OF CORRECTION

PATENT NO. : 5,638,934

DATED : June 17, 1997

INVENTOR(S) : Achim LINK and Reinhold WEIDINGER

Page 1 of 2

It is certified that error appears in the above-identified patent and that said Letters Patent is hereby corrected as shown below:

On the title page, item [56], under the U.S. PATENT DOCUMENTS section, insert the following:

```
--2,873,834    2/59     Kepner
  3,868,006    2/75     Linn et al.
  3,907,085    9/75     Rist
  3,912,058   10/75     Parkins
  4,109,773    8/78     Higgerson et al.
  4,591,039    5/86     Lutz et al.
  4,601,373    7/86     Despres et al.
  4,640,400    2/87     Nakane et al.
  4,779,713   10/88     Tomala et al.
  5,090,537    2/92     Fukuda
  5,456,344   10/95     Nellums--.
```

In column 3, line 28, after 'invention,', delete "end" and insert --and--.

In column 9, line 67, before '18', delete "pine" and insert --pins--.

In column 10, line 28, after '61a' insert --of--.

In column 10, line 58, after 'to', delete "Wiggan," and insert --Wiggen,--.

In column 11, line 24, before 'et', delete "Reinarts" and insert --Reinartz--.

In column 11, line 24, after 'et', delete "el.," and insert --al.,--.

UNITED STATES PATENT AND TRADEMARK OFFICE
CERTIFICATE OF CORRECTION

PATENT NO. : 5,638,934

DATED : June 17, 1997

INVENTOR(S) : Achim LINK and Reinhold WEIDINGER

It is certified that error appears in the above-identified patent and that said Letters Patent is hereby corrected as shown below:

In column 11, line 27, before 'entitled', delete "el.," and insert --al.,--.

In column 11, line 29, after 'and', delete "diSengaging" and insert --disengaging--.

In column 11, line 41, after 'stop', delete "21" and insert --22--.

In column 12, line 60, after '14' insert --684.1,--.

In column 19, line 1, Claim 19, after 'engaging', delete "end" and insert --and--.

In column 19, line 8, Claim 20, after 'said' insert --pin;--.

Signed and Sealed this

Sixteenth Day of December, 1997

BRUCE LEHMAN

Attest:

Attesting Officer

Commissioner of Patents and Trademarks